Patented Sept. 4, 1934

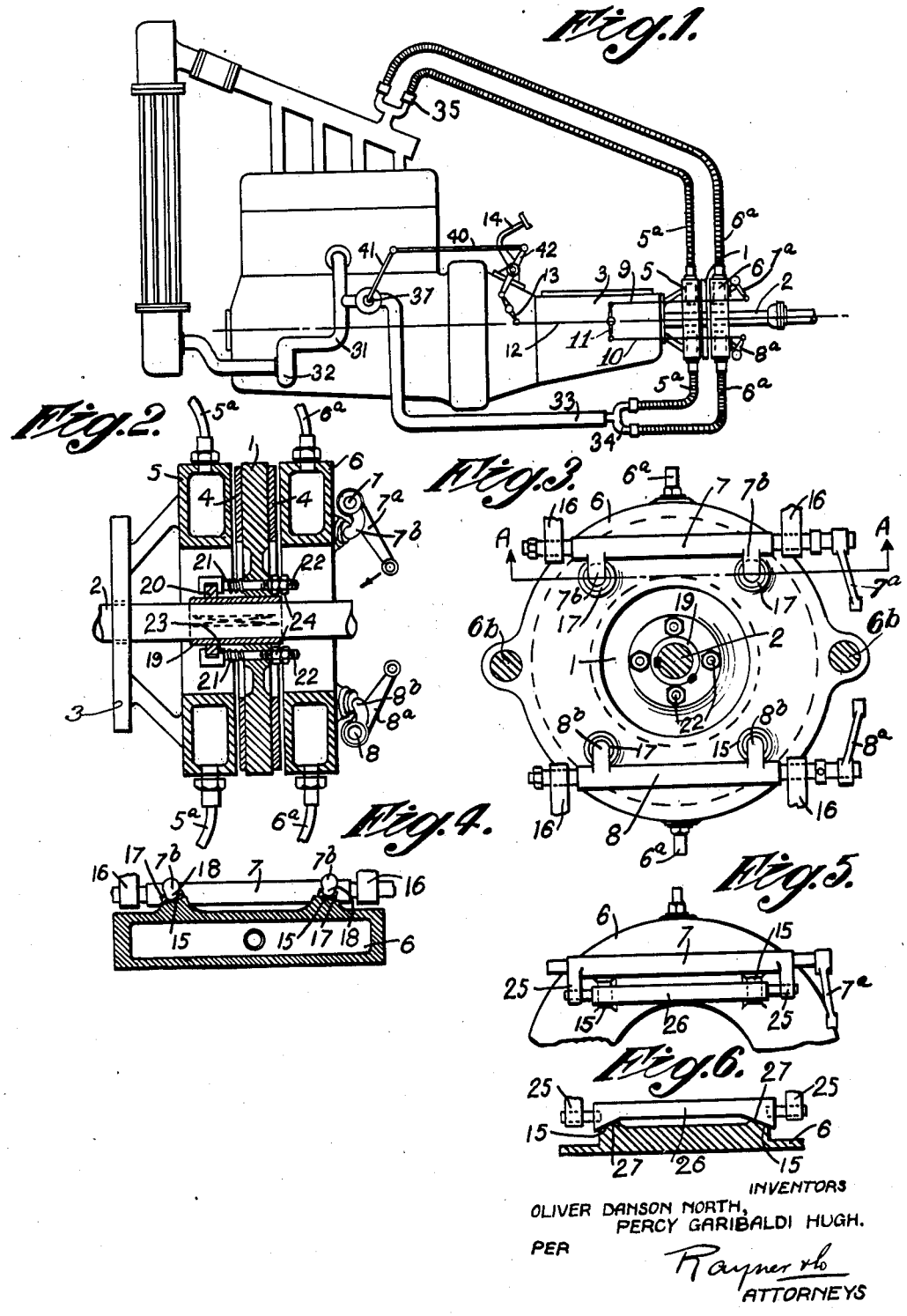

1,972,353

UNITED STATES PATENT OFFICE 1,972,353

BRAKE FOR MOTOR ROAD VEHICLES

Oliver Danson North and Percy Garibaldi Hugh, London, England, assignors to Scammell Lorries Limited, London, England Application May 7, 1930, Serial No. 450,480
In Great Britain May 15, 1929

4 Claims. (Cl. 188—72)

This invention relates to brakes for use on motor road vehicles. It is found that on some motor road vehicles, particularly heavy vehicles, for instance very heavy lorries and charabancs, the wear on the brake linings is such that they have to be renewed undesirably frequently. To a large extent this rapid wear is due to the heat generated when the brakes are applied so that by absorbing the generated heat at the operative surfaces of the brake linings the life of the brakes can be increased. The object of the present invention is to effect this.

Broadly our invention is characterized by the provision with each desired brake of means for transferring some of the heat generated during brake application to a fluid medium circulated in close proximity to the brake.

According to the preferred form of this invention we employ brake mechanism in which one or more of the brake elements is of hollow construction and is coupled to a water or other liquid circulating and cooling system such as is usually employed in connection with the motor power unit of the vehicle. The ordinary radiator and water circulating system of the motor vehicle may be employed in which case suitable means of control can be provided to circulate the water through the brake member when in operation and suitable precautions are taken to ensure the correct circulation of the cooling fluid through the brake member and the motor unit of the vehicle at the appropriate times and to prevent the operation of the one from interfering with the correct cooling of the other.

In carrying our invention into practice, we may employ a suitable brake element preferably held stationary and adapted to be brought into frictional contact with a moving member mounted upon or secured to a part of the transmission mechanism or the wheels of the vehicle. The stationary member is of hollow construction, and cooling fluid such as water may be circulated through it when in operation so as to keep the braking surfaces temperature within safe limits whenever the brake is in operation and even when it is kept constantly in use for very extended periods. The hollow brake member may be coupled in circuit with the ordinary cooling system of the motor unit of the vehicle so that a portion of the cooling water may be circulated through the brake member and returned to the radiator to be cooled, whilst further cooled water is drawn from the radiator into the hollow brake member. The cooling circuit for the brake is preferably arranged as a branch or shunt from the normal cooling circuit of the motor unit and is preferably cut off from the motor unit when the brake is not in use. For this purpose a suitable control valve may be arranged in the branch circuit of the brake in order to cut off or diminish the flow of cooling liquid through the brake when this is not in operation. This valve which may conveniently be of a simple butterfly deflector type may be coupled up with the brake pedal, hand lever or other mechanism for applying the brake so that the valve will automatically be opened when the brake is applied thus ensuring an effective circulation of cooling liquid through the brake when in operation. In order to cope with the additional load on the circulating pump this may conveniently be made somewhat larger than normally or if desired a separate or additional pump may be arranged in the branch circuit for cooling the brake, which will come into operation and assists the circulation when the brake is applied and the control valve operated. When the control valve is closed and the brake out of use this auxiliary pump or circulator will run idly with a negligible consumption of power.

In order that our invention may be clearly understood and readily carried into effect we have appended hereto a sheet of drawings illustrating embodiments thereof, and wherein:—

Fig. 1 is a diagrammatic side elevation view showing our invention applied to a brake mounted on the driving shaft of the vehicle.

Fig. 2 is a side elevation view partly in section showing the preferred arrangement of brake.

Fig. 3 is a rear elevation view of Fig. 2.

Fig. 4 is a section on the line A—A of Fig. 3.

Fig. 5 is a broken detail elevation view showing an alternative construction of brake member operating device.

Fig. 6 is a detail sectional plan view of Fig. 5.

Referring to Figs. 1 to 4 inclusive of the accompanying drawing we have shown the preferred arrangement of water cooled brake in which we employ a disc member 1 mounted upon a rotating part of the vehicle such for instance as shown, the transmission shaft 2 close behind the gear box 3 or any other convenient position. This disc 1 is preferably faced on both sides with suitable brake lining material 4 and a pair of hollow rings 5 and 6 are arranged on each side thereof and means are provided for holding them against rotation and for clamping the rotating disc 1 between them so as to grip it between them thus acting as a brake to retard or prevent its rotation. The two hollow rings 5 and 6 are suitably coupled by pipes 5a and 6a and hose or other flexible connections to a convenient cooling system for circulating water or other cooling liquid through the hollow brake rings 5 and 6.

Suitable compensating means may be provided for distributing the braking pressure evenly over the surfaces of the hollow braking rings and one convenient method of effecting this consists in providing a pair of operating shafts 7 and 8 arranged at suitable distances upon opposite sides of the centres of the rings 5 and 6 and provided with levers 7a and 8a connected by limbs or ligatures 9 and 10 respectively to a common yoke member 11 connected by a rod 12 to a lever 13 operated from a foot pedal or brake lever 14. This arrangement will distribute the braking load between the two shafts. Each of the two shafts 7 and 8 is provided with a pair of pressure arms 7b and 8b which are in turn arranged at equal distances upon either side of the centre of the shaft. These pressure arms 7b and 8b engage upon shoes 17 which bear against oppositely inclined facets 15 on one of the brake rings and the shafts 7 and 8 carrying these pressure arms are free to move axially in their supporting bearings 16 to a limited extent. This permits the shoes 17 to ride upon the inclined facets 15 on the brake ring 6 whilst the appropriate shaft 7 or 8 will move axially until the pressure applied by the two pressure arms to the shoes is substantially equalized. These pressure arms may conveniently be provided with ball ends 18 (see Fig. 4) which engage in corresponding recesses or sockets in the shoes which rest upon the inclined facets of the hollow brake ring 6. Whilst the two brake rings may be both moved towards each other the most convenient arrangement is to provide one brake ring 5 rigidly mounted upon the gear box 3 or other fixed portion of the vehicle whilst the other ring 6 is mounted to slide on two guide rods 6b so that it may be moved towards the fixed ring 5 so as to clamp the brake disc 1 between them. In this case the brake disc 1 is free to slide upon the transmission or other shaft 2 upon which it is mounted and for this purpose may be keyed or splined upon its shaft. Suitable means may be provided to centralize the brake disc 1 between the two brake rings 5 and 6 when the brake is out of operation so as to prevent friction and wear when the brake is disengaged. For this purpose the brake disc 1 may be splined upon a suitable hub 19 on the shaft 2 and upon this shaft hub 19 may be arranged a ring 20 frictionally held in place but capable of being displaced by the movement of the brake disc 1 when the brake is applied. This frictionally held ring 20 will then act as a means for spacing the disc 1 between the two brake rings 5 and 6 and for this purpose a suitable number of springs 21 are interposed between the hub of the brake disc 1 and the friction ring 20. These springs can be disposed about studs 22 passed through the hub of the brake disc 1 and secured to a collar 23 fitted about the ring 20. Suitable adjusting nuts 24 may be arranged on these studs 22 so that the brake disc 1 will be held centrally between the brake rings 5 and 6 and free from contact with either when the brake is not in operation. When the brake is brought into operation the springs will be compressed allowing the disc 1 to slide on its splines and when wear has taken place to a sufficient extent the brake pressure will move the frictionally held ring 20 to a new position. The frictional force by which this ring 20 is retained in place is not sufficient to interfere with the application of the brakes so that it will automatically be moved to a position when the brakes are applied which will cause the brake disc to be correctly centralized between the brake rings when the brake is released, and this adjustment will be correctly maintained as the brake surfaces wear.

Instead of the inclined facets 15 being engaged by shoes individually mounted on pressure arms, the rods 7 and 8 can be formed with lateral extensions 25 at their ends (see Figs. 5 and 6) in each pair of which are rotatably supported the ends of a bar 26 formed with symmetrical inclined bearing surfaces 27 at its ends engaging the inclined facets 15. The ends of the bars 26 may be axially slidable in the lateral extensions 25, or the rods 7 and 8 may be mounted for axial displacement.

A special source of water supply and circulating system may be provided for conveying water through the hollow brake rings 6 and 7, but if desired the ordinary engine water cooling system may be made use of as shown in Fig. 1, by connecting the outlet side 31 of the circulating pump 32 to a supply pipe 33 connected by a suitable coupling 34 to the inlet pipes of the pipes 5a and 6a. The outlet pipes of the pipes 5a and 6a can be connected by a suitable coupling 35 to the outlet manifold of the engine water jacket. If desired, means may be provided whereby normally the water is not circulated through the brake rings or shoes, but is automatically circulated through them when the brake is applied. This can be effected as shown diagrammatically in Fig. 1, by connecting a valve 37 in the pipe 33 to the brake pedal or lever so that as the pedal or lever is operated to apply the brake or brakes the valve 37 is opened. A link 40 can connect a lever 41 of the valve 37 to an extension 42 on the spindle or shaft of the brake pedal 14.

It will be appreciated that in the constructions shown in Figs. 2 to 6 inclusive, with very little adaptation the apparatus may be applied to brakes on an axle.

We claim:—

1. A brake for motor vehicles comprising a pair of hollow brake members, a brake disc interposed between them and fixed to the propeller shaft of the vehicle, one of said hollow brake members being stationary and the other movable co-axially towards it so as to grip the brake disc between the two hollow brake members, means for guiding said disc in sympathy with such movements and for returning it to a position clear of the two hollow brake members and centralized between them when the movable hollow brake member is retracted from the stationary one, the said hollow brake members being disposed about the said rotary transmission part of the vehicle and formed with substantially annular cooling chambers, the said centralizing means including means to compensate for wear of the braking surfaces.

2. In a brake for motor vehicles a pair of hollow brake members, a brake disc interposed between them and fixed to a rotary transmission part of the vehicle, means for moving one of the hollow brake members and the said disc successively towards the other hollow brake member, so that one hollow brake member presses the brake disc against the other, and means automatically compensating for wear of the braking surfaces for centralizing the brake disc between the hollow brake members, said compensating means comprising a collar frictionally gripped about the said rotary transmission part so that the collar can be moved under axial pressure, guides carried by said collar passing through said disc and springs on the guides urging said disc to the "off" position.

3. A brake for motor vehicles comprising a pair of hollow annular brake members, means for circulating a cooling fluid through said hollow member, a brake disc interposed between them and fixed to a rotary transmission part of the vehicle, both of said hollow brake members being disposed about and spaced from said rotary transmission part, one of them being stationary and the other movable co-axially towards said brake disc so as to grip the latter between the pair of fluid cooled annular surfaces, a pair of guides carried by the said rotary transmission part and surrounded by said hollow brake members, springs on said guides urging said disc away from the stationary hollow brake member, means for applying pressure at a number of points to the axially movable hollow brake member for applying the brake, and an axially adjustable member carried by said rotary transmission part and carrying said guides, providing with said springs means for automatically compensating for wear of the braking surfaces.

4. A brake for motor vehicles comprising a pair of hollow annular brake members, means for circulating a cooling fluid through said hollow members, a brake disc interposed between them and fixed to a rotary transmission part of the vehicle, both of said hollow brake members being disposed about and spaced from said rotary transmission part, one of them being stationary and the other movable co-axially towards it so as to grip the brake disc between the pair of fluid cooled annular surfaces, a pair of guides carried by the said rotary transmission part and surrounded by said hollow brake members, springs with said guides urging said disc away from the stationary hollow brake member, means for simultaneously applying pressure at a number of points to the axially movable hollow brake member for applying the brake, and a collar surrounded by one of the hollow brake members and frictionally gripped about the said rotary transmission part so that the collar can be moved under axial brake pressure, said collar carrying said guides.

OLIVER DANSON NORTH.
PERCY GARIBALDI HUGH.